(12) United States Patent
Salom et al.

(10) Patent No.: US 10,399,014 B2
(45) Date of Patent: Sep. 3, 2019

(54) FILTER SYSTEM, CLOSURE ELEMENT, AND FILTER ELEMENT

(71) Applicant: MANN+HUMMEL GMBH, Ludwigsburg (DE)

(72) Inventors: Rafael Salom, Remseck (DE); Martin Weindorf, Kornwestheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 130 days.

(21) Appl. No.: 15/403,650

(22) Filed: Jan. 11, 2017

(65) Prior Publication Data
US 2017/0197160 A1 Jul. 13, 2017

(30) Foreign Application Priority Data

Jan. 12, 2016 (DE) .................. 10 2016 000 157

(51) Int. Cl.
| | |
|---|---|
| B01D 29/33 | (2006.01) |
| B01D 29/58 | (2006.01) |
| B01D 29/21 | (2006.01) |
| B01D 36/00 | (2006.01) |
| B01D 17/00 | (2006.01) |
| B01D 35/16 | (2006.01) |
| B01D 35/153 | (2006.01) |
| F02M 37/22 | (2019.01) |
| B01D 17/04 | (2006.01) |
| B01D 35/30 | (2006.01) |
| B01D 35/00 | (2006.01) |

(52) U.S. Cl.
CPC ......... *B01D 29/333* (2013.01); *B01D 17/045* (2013.01); *B01D 17/10* (2013.01); *B01D 29/21* (2013.01); *B01D 29/58* (2013.01); *B01D 35/005* (2013.01); *B01D 35/153* (2013.01); *B01D 35/16* (2013.01); *B01D 35/30* (2013.01); *B01D 36/001* (2013.01); *B01D 36/003* (2013.01); *F02M 37/22* (2013.01); *B01D 2201/0415* (2013.01); *B01D 2201/16* (2013.01); *B01D 2201/295* (2013.01); *B01D 2201/305* (2013.01); *B01D 2201/307* (2013.01)

(58) Field of Classification Search
None
See application file for complete search history.

(56) References Cited

U.S. PATENT DOCUMENTS

| | | |
|---|---|---|
| 8,197,686 B2 | 6/2012 | Richmond |
| 8,800,782 B2 | 8/2014 | Roll |
| 2005/0020428 A1 | 1/2005 | Grosse-Wiesmann |

(Continued)

FOREIGN PATENT DOCUMENTS

DE 102014019145 A1 12/2015

*Primary Examiner* — Benjamin M Kurtz
(74) *Attorney, Agent, or Firm* — James Hasselbeck (57) ABSTRACT

A filter system (200) includes a housing (210) in which a replaceable filter element (100) is arranged between a pre-filtration side (202) and a post-filtration side (204). The filter element (100) has an element-fixed central tube (150), wherein a closure element (10) is provided on a housing side, the closure element (10) opening a post-filtration-side fluid outlet (250) when the filter element (100) has been inserted, and blocking the post-filtration-side fluid outlet (250) when the filter element (100) has been removed. The filter element (100) has an actuating element (160) for the closure element (10).

6 Claims, 7 Drawing Sheets

(56) References Cited

U.S. PATENT DOCUMENTS

| | | | |
|---|---|---|---|
| 2006/0054547 A1* | 3/2006 | Richmond | B01D 29/21 210/234 |
| 2008/0164188 A1 | 7/2008 | Jensen | |
| 2012/0024771 A1* | 2/2012 | Abdalla | B01D 29/21 210/234 |
| 2014/0284264 A1 | 9/2014 | Klein | |
| 2016/0076496 A1 | 3/2016 | Schweikart | |

* cited by examiner

FILTER SYSTEM, CLOSURE ELEMENT, AND FILTER ELEMENT

TECHNICAL FIELD

The present invention relates to: a filter element for filtering a fluid, in particular, fuel or oil; a filter system comprising a filter element, in particular, a fuel filter or oil filter of a vehicle; and a closure element for said filter system.

BACKGROUND

When a liquid filter—e.g., a fuel filter for diesel fuel—is in operation, the delivery of unpurified liquid to the internal combustion engine when a filter element has been removed must be avoided.

EP 1 937 962 B1 therefore proposes providing a slide valve in an upper region of the filter housing, with a through opening that is positioned when a filter element has been inserted so as to be aligned to a through opening on a housing-fixed central tube.

Also known, however, are filter systems without a housing-fixed central tube, where filter elements comprising element-side central tubes are used instead. Such filter systems are described in, for example, WO 2014/191486 A1.

SUMMARY

The present invention therefore addresses the problem of configuring a filter system so as to be able to easily and reliably avoid fouling of the post-filtration side when the filter element is removed, even with an element-fixed central tube.

The present invention further addresses the problem of creating a closure element for a filter system comprising an element-fixed central tube.

The aforementioned problems are solved according to one aspect of the present invention with a filter system comprising a housing in which a replaceable filter element is arranged between a pre-filtration side and a post-filtration side, the filter element comprising an element-fixed central tube and having, on a housing side, a closure element that closes the post-filtration side when the filter element is removed.

According to another aspect of the present invention, the problem is solved by a closure element that can be actuated by an element-fixed actuating element of a replaceable filter element.

Favorable configurations and advantages of the present invention arise from the additional claims, the description, and the drawings.

Proposed is a filter system having a housing in which a replaceable filter element is arranged between a pre-filtration side and a post-filtration side, which filter element comprises an element-fixed central tube, wherein a closure element is provided on a housing side, the closure element opening a post-filtration-side fluid outlet when the filter element has been inserted and blocking the post-filtration-side fluid outlet when the filter element has been removed, wherein the filter element has an actuating element for the closure element.

The filter system may be provided, in particular, in order to filter fuel in a vehicle having an internal combustion engine. The filter element may be equipped, in particular, with an element-fixed vent tube. The closure element reliably separates the post-filtration side from the pre-filtration side when the filter element is removed. This makes it possible to prevent unpurified fuel from reaching the post-filtration side during service. The closure element makes it possible to use the installation space in the interior of the filter element for a high-efficiency water separation from filtered fuel. The closure element mitigates the pressure loss, because no housing-fixed central tube or labyrinthine deflection in the flow path of the fluid is needed. During service, the filter pot can be cleaned or rinsed. The closure element is less onerous and a smaller component than a housing-fixed central tube.

The closure element entails a valve that is arranged in a bottom part of the housing. This results in an especially favorable arrangement for pressure loss and the flow behavior in the filter element.

According to a preferred embodiment, the closure element may be arranged with a fastening means on a housing-side fastening stub, wherein a region of the closure element abuts against an outer wall or inner wall thereof. This results in a very compact arrangement, which can be presented as favorable for tools. In one embodiment, the fastening means of the closure element may abut against the fastening stub on the inside. Then, the outer wall of the fastening stub can be advantageously used to seal off, and as a sliding surface for a sliding sleeve of the closure element. Purified fluid can be guided into a region of the interior space of the closure element.

Alternatively, the fastening means of the closure element may abut against the fastening stub on the outside. Then, an outer side of the fastening means can be advantageously used to seal off and as a sliding surface for a sliding sleeve of the closure element. Purified fluid can be guided in a region of the interior space of the closure element.

According to a preferred embodiment, the actuating element may comprise one or more axial support ribs of the filter element that are arranged on the post-filtration side and press in the axial direction on a movable sliding sleeve of the closure element. Advantageously, the actuating element may move the sliding sleeve against a spring force and open a flow to the post-filtration side. Should the filter element—and, thus, the actuating element—be removed, then the spring force moves the sliding sleeve toward the valve seat, whereby the flow to the post-filtration side is blocked. The post-filtration side is then protected against foreign bodies and fouling.

According to the present invention, the closure element has an axial opening for receiving an element-fixed vent tube. Combining a housing-fixed closure element in the bottom region of the housing and an element-fixed vent tube achieves, overall, both a lower pressure loss and a greater sedimentation gap, as well as improved water separation from the filtered fuel, because no upwardly-directed flow that could hinder sedimentation of drops of water occurs in the filter system. The opening is configured for fluid-tight connection to the vent tube. When the filter element is inserted into the filter system, the vent tube can be inserted into the opening, and the filter element can thus be axially guided. Between vent tube and opening, a seal can be arranged, e.g., in the form of an O-ring around the lower end of the vent tube, wherein the wall of the opening serves as a sealing surface. An inverted arrangement is also conceivable, as are other manners of sealing, as necessary.

According to a preferred embodiment, the filter element may be provided with a water separation device that is arranged on the post-filtration side and comprises a final separator and/or a coalescer, which final separator and/or coalescer is/are arranged concentrically about the vent tube.

Within the filter element, the closure element creates space for efficient water separation. Fuel, for example, may contain a certain amount of water, which can damage the injection system of an internal combustion engine. In order to prevent this, the water contained can be set in rotation on the post-filtration side of the filter system, for example, via a swirl device, and thus separated and drained separately due to the different specific gravity of the water from the fuel. Alternatively thereto, a coalescer serves to agglomerate small water droplets into larger drops of water, which can then collect and run off at a final separator due to gravitation. In the water separation, the coalescer, the shape of the sedimentation space of the water droplets, and the final separator can work advantageously together as a water separation device.

Proposed according to another aspect of the present invention is a closure element for a filter system in which a replaceable filter element can be arranged between a pre-filtration side and a post-filtration side, comprising a valve body having an abutment for a sliding sleeve that is slidable axially along the valve body, wherein the sliding sleeve has a contact surface for an external actuating element and can be removed from the abutment with the application of the actuating element. The closure element further comprises an axially continuous opening for an element-fixed vent tube.

According to a preferred embodiment, the sliding sleeve may comprise an inner region—coaxial to the valve body—having one or more through openings and a skirt-shaped region that is arranged coaxially to the inner region and to the valve body, wherein a sealing surface is arranged at the inner region, the sealing surface being provided for abutment against the valve seat in the closed state. The space between the inner and outer sleeve region serves as a through flow region in the open state.

According to a preferred embodiment, the contact surface maybe arranged radially outside of the sealing surface. This enables a reliable and non-problematic contact through an actuating element in the mounted state.

According to a preferred embodiment, the outer skirt-shaped region may be provided as a sealing surface on the inner side thereof in the mounted state. The inner surface may, in particular, form a contact surface against a fastening stub that serves to receive the closure element. Alternatively, the inner surface may form, in particular, a contact surface against the fastening element, with which the closure element is fastened to the fastening stub.

According to a preferred embodiment, a spring-receiving region, in particular, comprising a compression spring for moving the sliding sleeve may be configured downstream of the abutment. Advantageously, a compression spring may be arranged there. The compression spring may be formed of metal or, alternatively, of a plastic, preferably a glass fiber-reinforced plastic. The spring force may be selected so that even without mechanical actuation of the sliding sleeve through an actuating element, it is possible for fuel to flow through the filter system, and, for example, fuel reaches the high-pressure pump, but the flow resistance through the now hydraulically-opened closure element signals a high pressure loss to the end user and thus generates a service signal. Alternatively, the spring force may be selected so that without mechanical actuation through the actuating element, the pressure in the low-pressure circuit is not sufficient to open the closure element, and thus it is not possible to operate the internal combustion engine without an inserted filter element.

According to a preferred embodiment, a fastening element having fastening means for fastening to a mounting position may be provided at the sliding sleeve-side end of the valve body. Advantageously, this may be, for example, latching hooks that can be hooked securely onto a housing-side counter-element in the form of the fastening stub.

According to a preferred embodiment, the spring-receiving region may be arranged coaxially to the fastening means. This enables a compact configuration of the closure element.

According to a preferred embodiment, a central opening in the axial direction may be provided at the end of the valve body that lies opposite to the sliding sleeve-side end of the valve body. This opening may advantageously be used to receive a vent tube of the filter element.

Proposed according to another aspect of the present invention is a replaceable filter element having an element-fixed central tube for a filter system, comprising a housing in which the replaceable filter element is arranged between a pre-filtration side and a post-filtration side, and comprising an element-fixed actuating element for a housing-side closure element that opens a post-filtration-side fluid outlet when the filter element is inserted and blocks the post-filtration-side fluid outlet when the filter element is removed. Element further comprises a water separation device that is arranged on the post-filtration side and comprises a final separator and/or coalescer that is/are arranged concentrically about the vent tube. The actuating element has axial support ribs that are arranged on the post-filtration side and support the final separator radially against the vent tube.

BRIEF DESCRIPTION OF THE DRAWINGS

Further advantages result from the following description of the drawings. The drawings depict embodiments of the present invention. The drawings, the description, and the claims contain numerous features in combination. A person skilled in the art will also consider the features individually as appropriate and combine the features into reasonable additional combinations.

DETAILED DESCRIPTION

In the drawings, identical or similar components are numbered with identical reference signs. The drawings only illustrate examples, and are not to be understood to be limiting in nature.

The present invention is depicted with a fuel filter, but can also be provided for other filter systems with corresponding adaptation to the construction.

Figure 1:
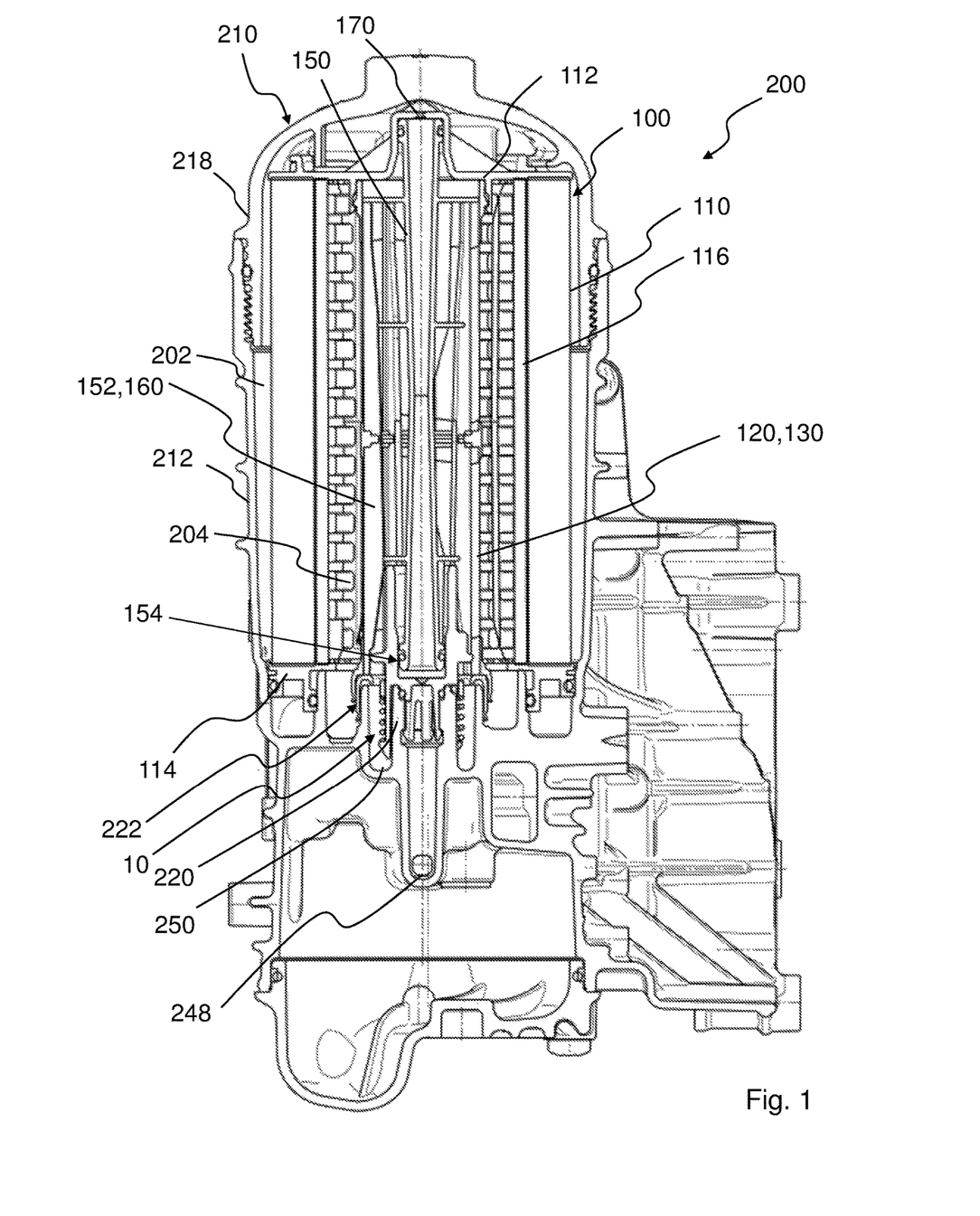
FIG. 1 illustrates a longitudinal cross-section through a filter system with a housing-side closure element according to one embodiment of the present invention, for fuel filtration in a vehicle.
Figure 2:
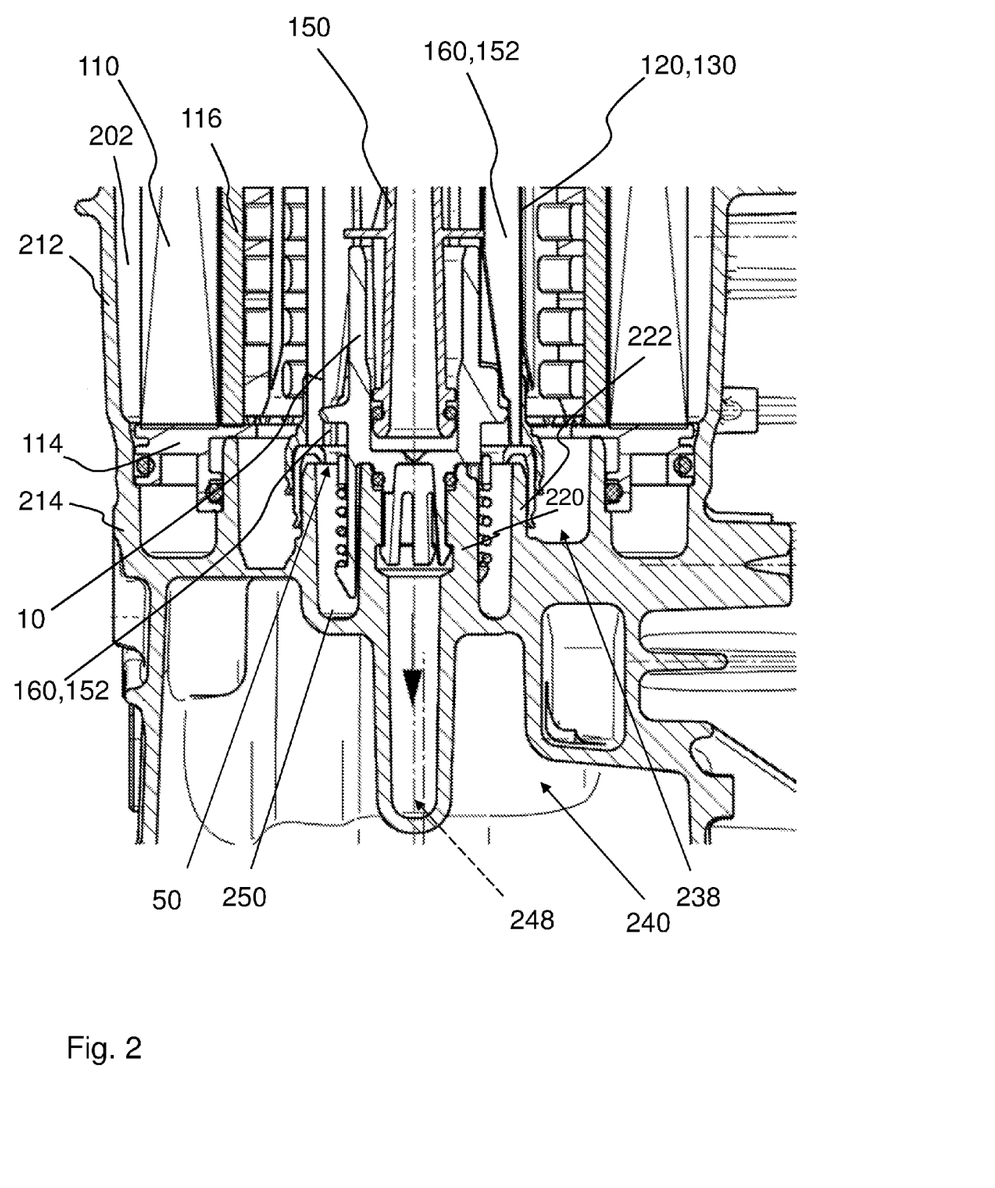
FIG. 2 illustrates a detailed view of the lower part of the longitudinal cross-section of FIG. 1, with details of the arrangement of the closure element in the filter system.

FIG. 1 illustrates a longitudinal cross-section through a filter system 200 according to an embodiment of the present invention for the fuel filtration in a vehicle. FIG. 2 illustrates a detailed view of the lower part of the longitudinal cross-section of FIG. 1, with a detail of the arrangement of a closure element 10 in the filter system 200.

The filter system 200 comprises a housing 210 having a housing lower part 212 comprising a bottom 214 and a housing upper part 218 in the form of a screwable cover, as well as a filter element 100 that is arranged in the housing 210 and separates a pre-filtration side 202 from a post-filtration side 204. The filter element 100 can receive a flow therethrough in the radial direction, e.g., from the outside to the inside.

The filter element is, e.g., a cylindrical body having a closed upper end plate 112 and an open lower end plate 114. The filter bellows 110 may be, for example, star-folded. The filter bellows 110 is arranged on an element-fixed central tube 116, and surrounds a final separator 130 as a water separation device 120, in order to separate water from the fuel at the post-filtration side 204. Optionally, a coalescer may be provided between central tube 116 and final separator 130, in order to improve the water separation. The water is collected on the post-filtration side via a water path 238 into a collecting space 240 below the filter element 100. The purified fuel is guided through the open end plate 114 to a fluid outlet 250. A central channel 248 is provided as a runback to the tank (not shown).

The filter element 100 further comprises an element-fixed vent tube 150 that is surrounded coaxially by filter bellows 110 and final separator 130. The vent tube 150 has a vent opening 170 at the upper end on the closed end plate 112, and is inserted and sealed off with a sealing ring 154 at the lower end in the axial opening 60 of the closure element 10. When the filter system 200 is put into operation, air is present in the vent tube 150, whereas during operation, the vent tube 150 is filled with fuel of the pre-filtration side 202.

The filter element 100 is, for example, connected to a quick connector in the form of a snap connection to the housing upper part 218, and can thus be pulled out from the housing lower part 212 with the unscrewed housing upper part 218, for example, when the filter element 100 is being replaced for maintenance purposes.

Some filter elements and filter systems comprising an element-fixed central tube and element-fixed vent line as a central support tube are described, for example, in WO 2014/191486 A1.

According to the present invention, the filter system 200 has the closure element 10 on the housing side, the closure element 10 opening the post-filtration-side fluid outlet 250 when the filter element 100 has been inserted and blocking the post-filtration-side fluid outlet 250 when the filter element 100 has been removed. For this purpose, the filter element 100 has an actuating element 160 for the closure element 10.

The closure element 10 is arranged in the bottom part 214 of the housing 210, and fixed there in a fastening stub 220, wherein a skirt-shaped region 42 of a sliding sleeve 40 of the closure element 10 abuts against an outer wall of the cylinder section 222 surrounding the fastening stub 220. The outer wall forms a sliding and sealing surface for the skirt-shaped region 42 of the sliding sleeve 40. The closure element 10 is hooked, for example, with fastening means onto an inner wall of the fastening stub 220.

The actuating element 160 comprises a plurality of axial support ribs 152 of the filter element 100 that are arranged on the post-filtration side and press in the axial direction on the movable sliding sleeve 40 of the closure element 10. The support ribs 152 support the final separator 130 radially toward the vent tube 150.

The pressing of the sliding sleeve 40 by the support ribs 152 in the direction of bottom 214 opens a through flow through a post-filtration fluid passage 50 in the form of a plurality of through openings in the inner region of the sliding sleeve 40 of the closure element 10 to the fluid outlet 250.

Figure 3:
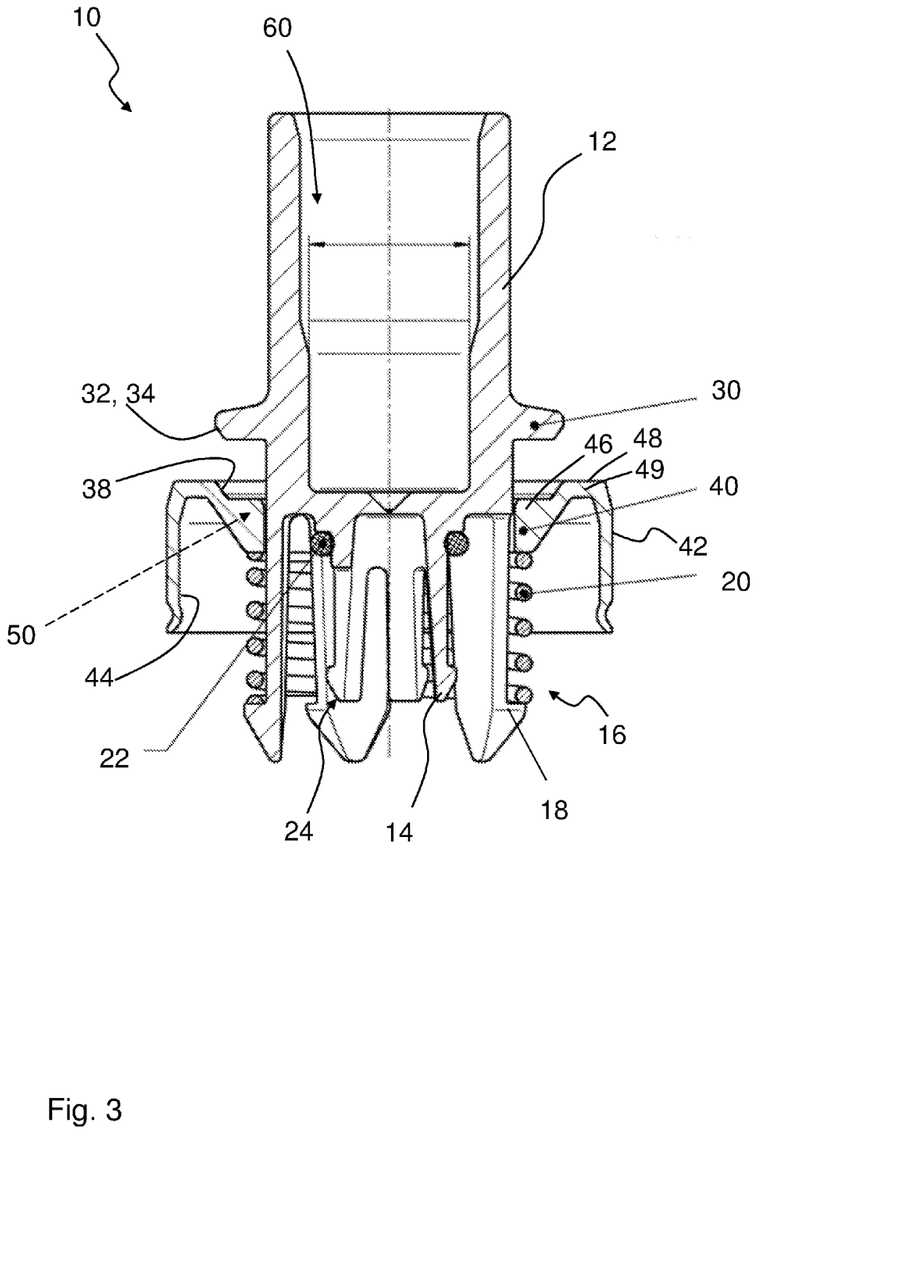
FIG. 3 illustrates a detailed view of the closure element from FIG. 1, in the opened state.
Figure 4:
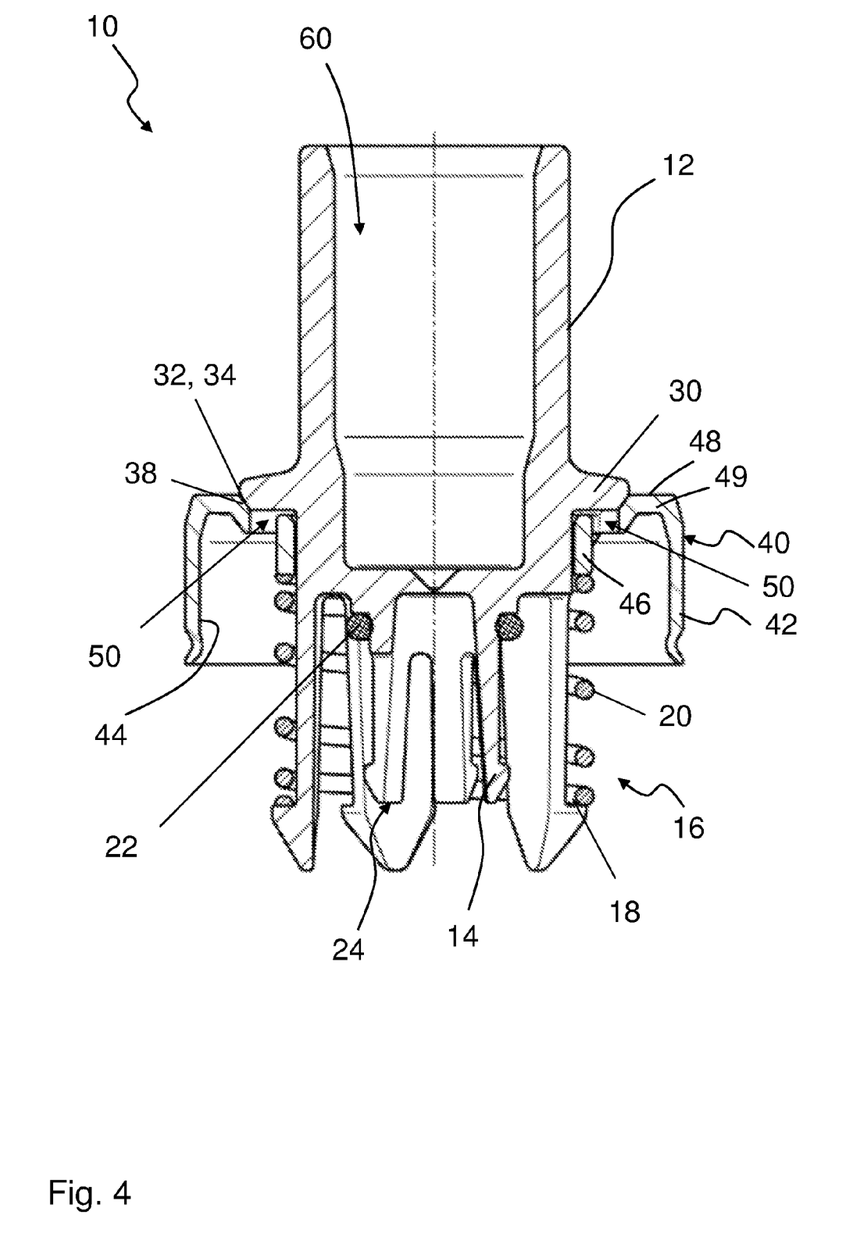
FIG. 4 illustrates a detailed view of the closure element from FIG. 1, in the closed state.

The closure element 10 is depicted in detail in FIGS. 3 and 4. FIG. 3 and FIG. 4 illustrate the closure element 10 in the opened state and in the closed state, respectively.

The closure element 10 comprises an essentially cylindrical valve body 12 having a valve seat 30 that runs so as to radially protrude on the outer circumference, for a sliding sleeve 40 that can be displaced axially along the valve body 12 and surrounds the valve body 12 coaxially.

A spring-receiving region 16 having a compression spring 20 is arranged on the sliding sleeve-side free end of the valve body 12, wherein the compression spring 20 extends between a spring rest 18 at the free end of the valve body 12 and a spring rest of a section 46 in the inner region of the sliding sleeve 40. The compression spring 20 abuts at the lower end against a flattening of the section 46. The section 46 is cylindrical on the inner circumference thereof and can thus slide along the valve body 12 in order to close or open the closure element 10, and widens conically from the rest for the compression spring 20 on the outer side thereof to a region 49 of the sliding sleeve 40 at a transition to a fluid-tight skirt-shaped outer region 42 that coaxially surrounds the section 46. The outer region 42 extends to the free end of the valve body 12 and partially surrounds the spring-receiving region 16. The region 49 has a contact surface 48 for actuating elements 160 (FIGS. 1 and 2) that is oriented away from the free end of the valve body 12.

Between the inner section 46 and the outer region 42 of the sliding sleeve 40, there is arranged a circumferential sealing surface 38 that, in the closed state of the closure element 10 (FIG. 4), comes to bear against a sealing means 32 in the form of a circumferential sealing surface 34 of the valve seat 30. For example, the sealing surfaces 34, 38 are of complementary shapes and configured so as to be oblique against the longitudinal axis of the valve body 12. The post-filtration fluid passage 50 in the section 46 of the inner region of the sliding sleeve 40 is provided so as to lie radially inward from the sealing surface 38.

The annular contact surface 48—which serves to abut an external actuating element 160, such as the support ribs from FIGS. 1 and 2—is configured between the section 46 and the skirt-shaped region 42, radially outward from the sealing surface 38. On insertion of the filter element 100 (FIGS. 1 and 2), the actuating element 160 presses the sliding sleeve 40 to the bottom of the housing and thus opens the post-filtration fluid passage 50. On removal of the filter element 100 (FIGS. 1 and 2), the compression spring 20 presses the sliding sleeve 40 with the sealing surface 38 thereof against the sealing means 32 and closes therewith the post-filtration fluid passage 50.

In the mounted state on the inner side 44 thereof, the outer skirt-shaped region 42 serves as a bearing surface and sealing surface to the cylindrical section 222 (FIGS. 1 and 2).

Provided at the sliding sleeve-side free end of the valve body 12 is a fastening element 24 having fastening means 14 in the form of latching hooks for fastening to a mounting position. The latching hooks are, for example, oriented inward and may be securely hooked onto a counter-element (fastening stub 220) of the housing 210 (FIGS. 1 and 2). A seal 22 in the form of an O-ring seals off the region between fastening means 14 and the spring receptacle 16, which coaxially surrounds the fastening means.

Figure 5:
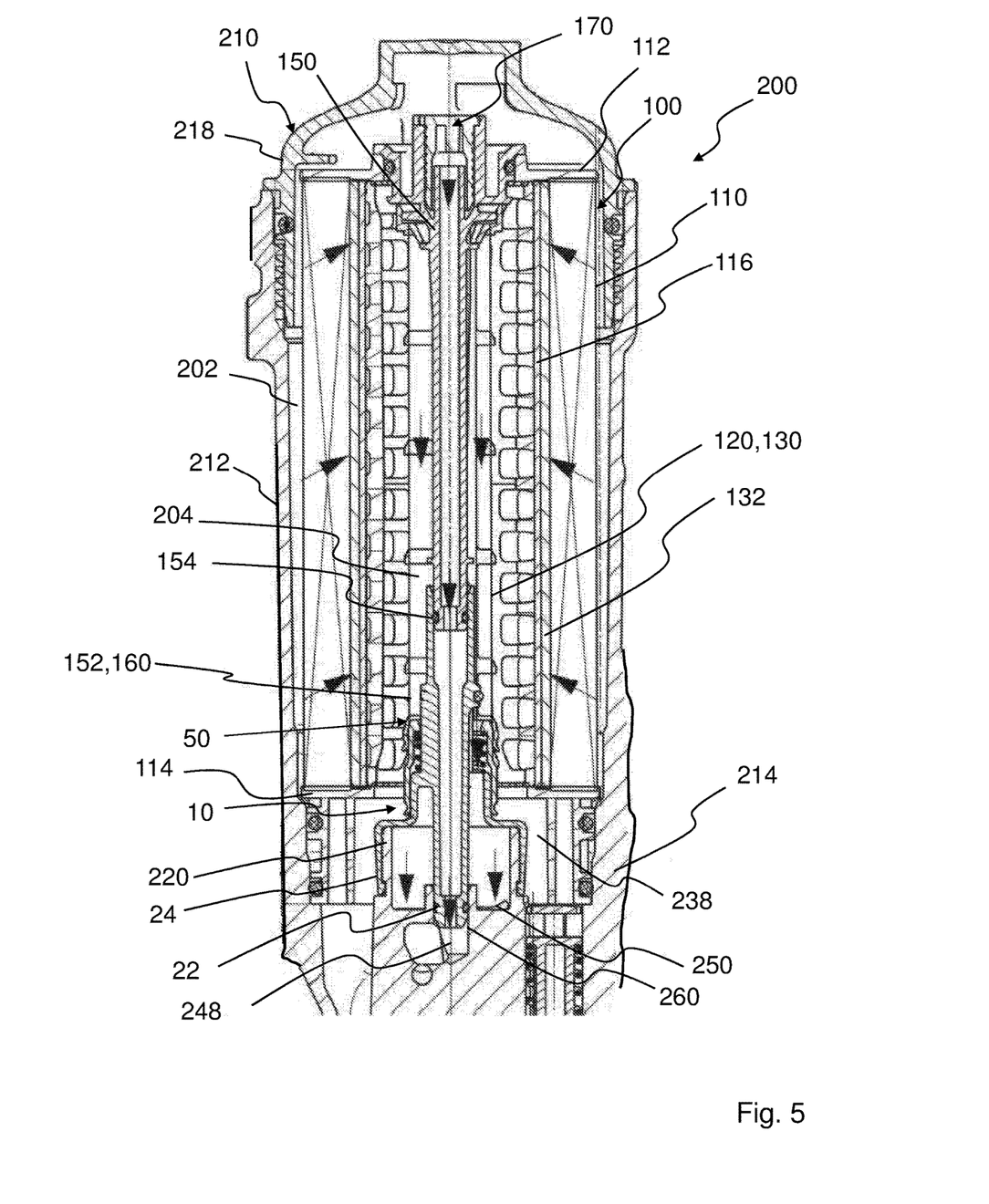
FIG. 5 illustrates a filter system with a housing-side closure element according to a second embodiment.

FIG. 5 depicts a longitudinal section of another embodiment of a filter system 200 according to an embodiment of the present invention for fuel filtration in a vehicle having a housing-side closure element 10.

The filter system 200 comprises a housing 210 having a housing lower part 212 comprising a bottom 214 and a housing upper part 218 in the form of a screwable cover, as well as a filter element 100 that is arranged in the housing 210 and separates a pre-filtration side 202 from a post-filtration side 204. The filter element 100 can receive a flow therethrough in the radial direction, e.g., from the outside to the inside, as is indicated by arrows facing from the outside to the inside.

The filter element 100 is, for example, a cylindrical body having end plates 112, 114 that are open on both sides. The upper end plate 112 is connected in a sealed manner at the inner circumference thereof to a head part of a vent tube 150 that is sealed against the post-filtration side 204 and extends in the interior of the filter element 100 to the closure element 10.

The filter bellows 110 of the filter element 100 may be, for example, star-folded. The filter bellows 110 is arranged on an element-fixed central tube 116, and surrounds a final separator 130 as a water separation device 120, in order to separate water from the fuel at the post-filtration side 204. A coalescer 132 for improving the water separation is provided between the central tube 116 and the filter bellows 110. The water can be collected on the post-filtration side via a water path 238 into a collecting space below the filter element 100. The purified fuel is guided through the open end plate 114 to a fluid outlet 250. A central channel 248 is provided as a runback of fuel to the tank (not shown).

Furthermore, the filter element 100 has an element-fixed vent tube 150 that is surrounded coaxially by the filter bellows 110 and final separator 130. The vent tube 150 has vent openings 170 on the upper end plate 112, and is inserted and sealed off with a sealing ring 154 at the lower end in the axial opening 60 of the closure element 10. When the filter system 200 is put into operation, air is present in the vent tube 150, whereas during operation, the vent tube 150 is filled with fuel of the pre-filtration side 202.

The filter element 100 may be, for example, connected by a quick connector in the form of a snap connection to the housing upper part 218, and can thus be pulled out from the housing lower part 212 with the unscrewed housing upper part 218, for example, when the filter element 100 is being replaced for maintenance purposes.

Some filter elements and filter systems comprising an element-fixed central tube and element-fixed vent line as a central support tube are described, for example, in WO 2014/191486 A1.

According to the present invention, the filter system 200 has the closure element 10 on the housing side, the closure element 10 opening the post-filtration-side fluid outlet 250 when the filter element 100 has been inserted and blocking the post-filtration-side fluid outlet 250 when the filter element 100 has been removed. For this purpose, the filter element 100 has an actuating element 160 for the closure element 10. The actuating element 160 comprises a plurality of axial support ribs 152 of the filter element 100 that are arranged on the post-filtration side and press in the axial direction on the movable sliding sleeve 40 of the closure element 10. The support ribs 152 support the final separator 130 radially toward the vent tube 150.

The closure element 10 is arranged on a fastening stub 220 in the bottom part 214 of the housing 210 that is open to the housing upper part 218. The closure element 10 overlaps the fastening stub 220 and is fastened, e.g., by means of snap hooks to the outer side of the fastening stub 220. A housing-side outlet 260 into which the lower end of the closure element 10 projects and is sealed off there from the post-filtration side 204 with a seal 22 is arranged at the bottom region of the fastening stub 220. The outlet 260 connects the vent tube 150 via the closure element 10 to the channel 248 for runback of fuel into the tank (not shown). Purified fuel can flow in the fastening stub 220 around the lower end of the closure element 10 to the fluid outlet 250. Outside of the fastening stub 220, post-filtration-side water can flow to a collecting space (not shown).

The pressing of the sliding sleeve 40 by the support ribs 152 in the direction of bottom 214 opens a through flow through a through opening in the closure element 10 to the fluid outlet 250.

Figure 6:
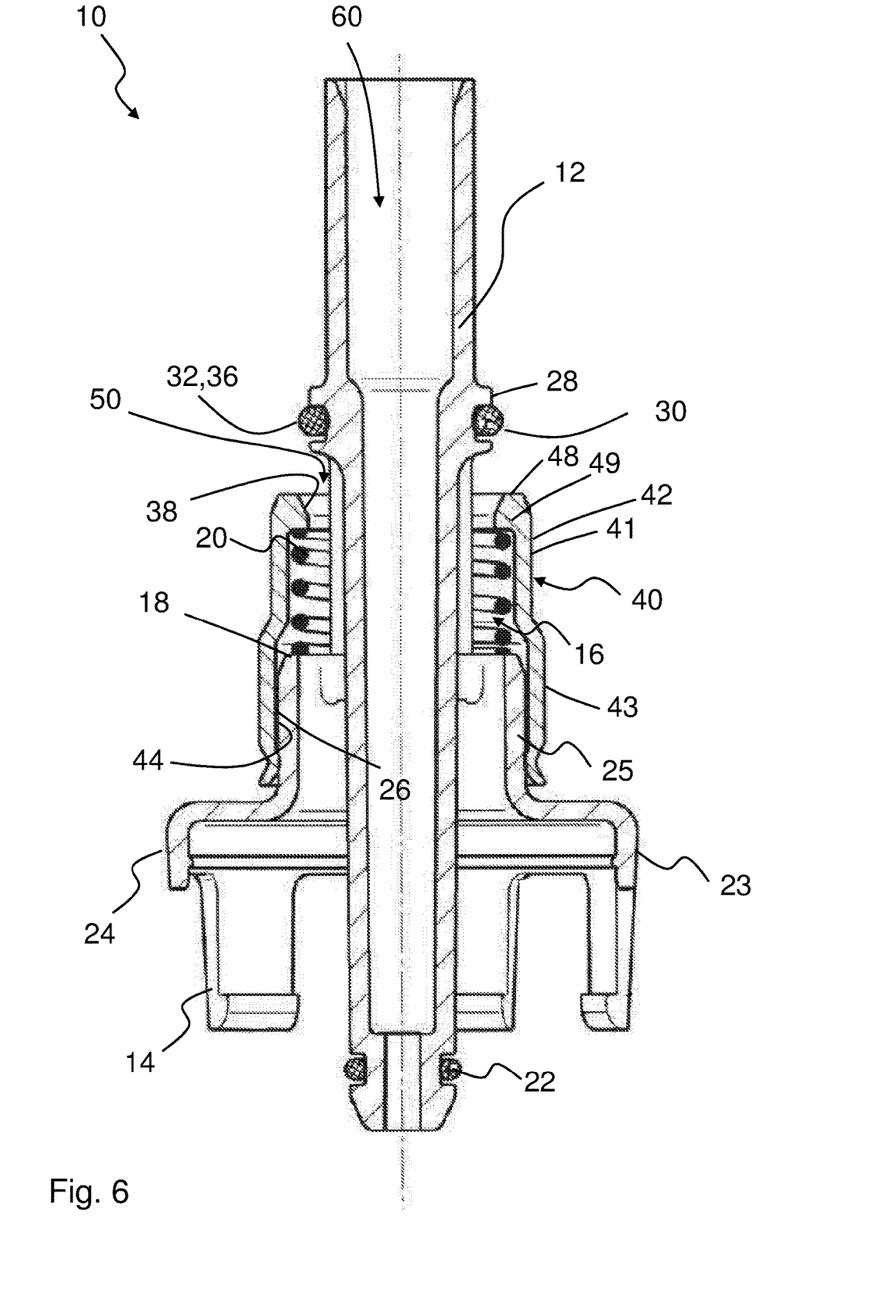
FIG. 6 illustrates a detailed view of the closure element from FIG. 5, in the opened state.
Figure 7:
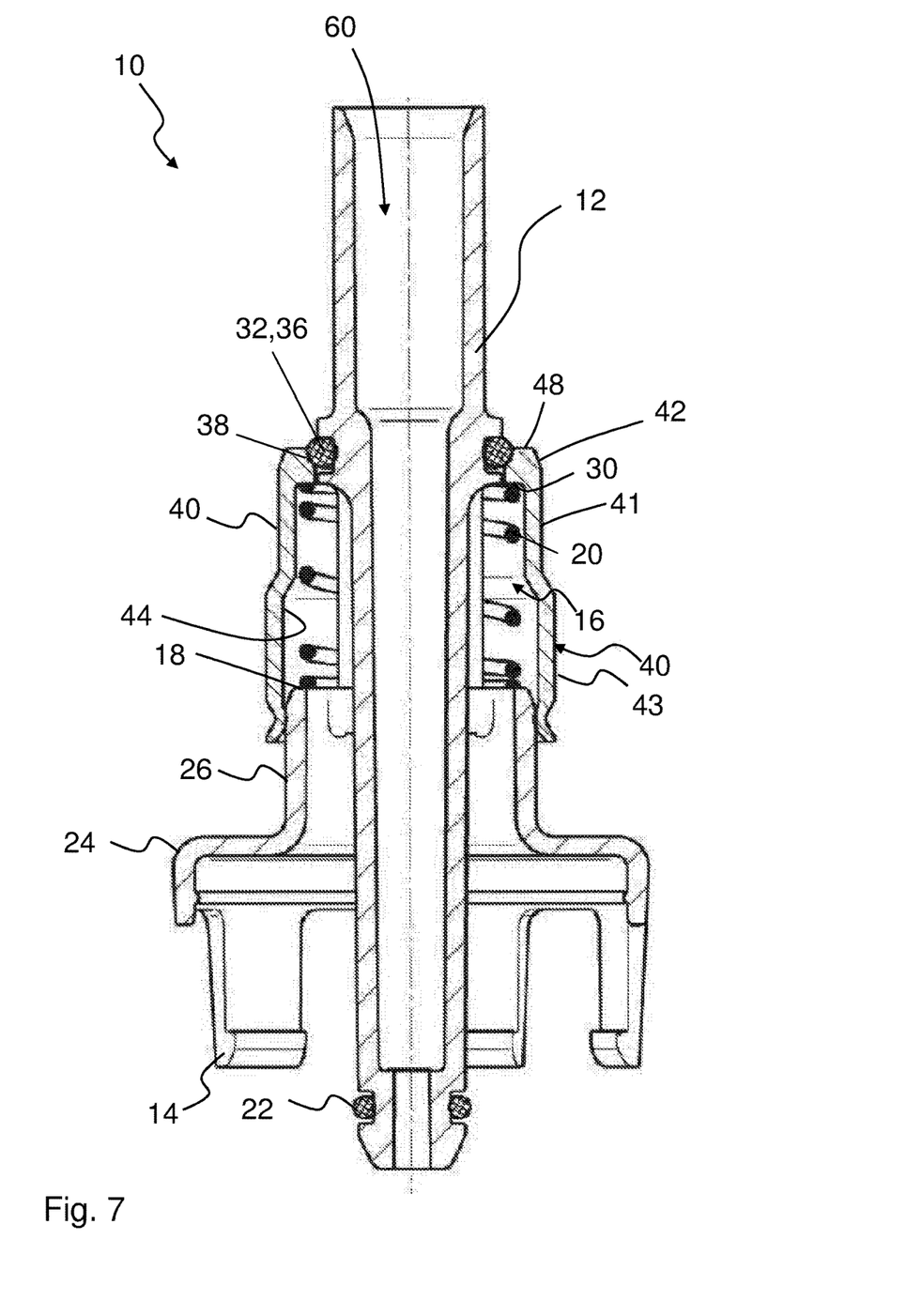
FIG. 7 illustrates a detailed view of the closure element from FIG. 5, in the closed state.

FIG. 6 illustrates a detailed view of the closure element 10 from FIG. 5 in the opened state, while FIG. 7 illustrates a detailed view of the closure element 10 from FIG. 5 in the closed state.

The closure element 10 comprises an essentially cylindrical valve body 12 having an axially continuous opening 60 having a sealing means receptacle 28 that runs so as to protrude radially at the outer circumference, with a groove in which a sealing means 32 in the form of a sealing ring 36 is put in.

The closure element 10 has a fastening element 24 with which the closure element 10 can be inserted in a housing-fixed manner into a housing 210 (FIG. 5). The fastening element 24 is stepped and has fastening means 14, e.g., in the form of latching hooks, in a lower section 23, and is configured as a cylinder section in an upper section 25 adjacent thereto.

The axially continuous opening 60 for receiving the lower end of the vent tube 150 with the seal 154 thereof (FIG. 5) is provided at an end of the valve body 12 that faces the housing upper part 218 (FIG. 5) in the installed state. At the opposite lower end of the valve body 12, a groove with a seal 22 that serves to seal off the valve body 12 in a bottom-side outlet 260 of the housing 210 (FIG. 5) is provided at the outer circumference.

In the region of the sealing means receptacle 28, the opening 60 has a step, so that the inner diameter is tapered in the direction of the lower end. The outer diameter, too, is smaller below the sealing means receptacle 28 than above.

Below the sealing means receptacle 28, there is provided a sliding sleeve 40 that is movable in the axial direction along the valve body 12 between an opened position (with an inserted filter element) and a closed position (with a removed filter element). The sliding sleeve 40 is pressed into the closed position by means of a compression spring 20 arranged in a spring-receiving region 16 of the closure element 10, and into the opened position by filter element-side actuating elements over a contact surface 48 of the sliding sleeve 40.

The compression spring 20 extends between a spring rest 18 at the end side of the fastening element 24 that faces the abutment 30 and a spring rest at a region 49 of the sliding sleeve 40. At the inner side of the region 49, there is arranged a sealing surface 38 that abuts against the sealing means 32 in the form of a circumferential sealing ring 36 when the closure element 10 is closed (FIG. 7). The sealing surface 38 is, for example, a bevel at the region 49. The region 49 has a contact surface 48 for actuating elements 160 (FIG. 5), which is oriented away from the free end of the valve body 12.

Going from the contact surface 48, the region 49 transitions externally into a skirt-shaped outer region 42 of the sliding sleeve 40, which is arranged coaxially to the valve body 12 and is stepped with an upper section 41 and a lower section 43. The upper section 41 has a smaller diameter than the lower section 43. In the open state of the closure element 10, the sliding sleeve 40 abuts with the inner side 44 thereof at the lower section 43 against an outer side 26 of the upper cylinder section 25 of the fastening element 24. The outer side 26 of the upper cylinder section 25 forms a sliding and sealing surface for the skirt-shaped region 42 of the sliding sleeve 40.

What is claimed is:

1. A filter system for a fluid, comprising:
   a replaceable filter element;
   a housing within which the filter element is arranged between a pre-filtration side and a post-filtration side of the housing, the housing including:
      a cylindrical projection formed on a bottom wall of the housing that projects towards the filter element, the cylindrical projection circumferentially enclosing a post-filtration-side fluid outlet of the housing;
   wherein the replaceable filter element comprises:
      an annular filter bellows;
      a central tube fixedly attached to the filter element;
      axial support ribs arranged in an interior of the annular filter bellows and fixed attached to the filter element;
   a valve member arranged on the cylindrical projection of the housing, the valve member including:
      a valve body having an opening at a first axial end of the valve body, the opening configured to receive an axial end of a vent tube of the filter element;
      a valve seat formed as a ring-shaped projection, protruding radially outwardly from an outer circumference of the valve body;
      an annular sliding member arranged slidably on the outer circumference of the valve body and encircling the valve body, the annular sliding member, having:
         a sliding sleeve arranged to slide on the outer circumference of the valve body between a second axial end of the of the valve body and the valve seat;
         at least one fluid passage extending through the annular sliding member to the post-filtration-side fluid outlet; and
         a circumferential sealing surface on an axially outer side of the annular sliding member against which the valve seat seals when the valve member is in a closed position, closing the at least one fluid passage; and
      a compression spring arranged on the valve body, the compression spring urging the annular sliding member to slide towards the valve seat;
   wherein an end face of the axial support ribs contact against the annular sliding member of the valve member, opening the post-filtration-side fluid outlet of the filter housing when the filter element has been inserted, and
   blocking the post-filtration-side fluid outlet when the filter element has been removed from the housing.

2. The filter system according to claim 1, wherein the housing includes a fastening stub formed as a projection arranged in an interior of the cylindrical projection of the housing;
   wherein a second axial end of the valve body is fastened to the fastening stub.

3. The filter system according to claim 2, wherein the second axial end of the valve body abuts internally against the fastening stub.

4. The filter system according to claim 2, wherein the sliding sleeve is arranged so as to be axially movable with an inner side on an outer side of the fastening stub.

5. The filter system according to claim 1, wherein the filter element is provided with a water separation device that is arranged on the post-filtration side and comprises
   a final separator and/or a coalescer;
   wherein the final separator and/or coalescer is/are arranged concentrically about the vent tube.

6. The filter system according to claim 1, wherein the annular sliding member further comprises
   an axially extending annular skirt which slides on and closes against a radially outer surface of the cylindrical projection of the housing.

* * * * *